US009532624B2

(12) United States Patent
Lap et al.

(10) Patent No.: US 9,532,624 B2
(45) Date of Patent: Jan. 3, 2017

(54) ARTICLE OF FOOTWEAR AND RELATED METHODS

(71) Applicant: Ja Vie, LLC, Carson City, NV (US)

(72) Inventors: Chow Chi Lap, Aberdeen (HK); Natalie Hsiang Chun Lin, Rancho Palos Verdes, CA (US)

(73) Assignee: Ja Vie, LLC, Carson City, NV (US)

( * ) Notice: Subject to any disclaimer, the term of this patent is extended or adjusted under 35 U.S.C. 154(b) by 277 days.

(21) Appl. No.: 14/163,358

(22) Filed: Jan. 24, 2014

(65) Prior Publication Data

US 2014/0310989 A1 Oct. 23, 2014

Related U.S. Application Data

(60) Provisional application No. 61/756,624, filed on Jan. 25, 2013.

(51) Int. Cl.

| | |
|---|---|
| ***A43B 3/10*** | (2006.01) |
| ***A43B 13/18*** | (2006.01) |
| ***A43B 3/24*** | (2006.01) |
| ***A43B 3/00*** | (2006.01) |
| ***A43B 23/07*** | (2006.01) |
| ***B29D 35/04*** | (2010.01) |
| ***A43B 7/32*** | (2006.01) |

(52) U.S. Cl.

CPC ............ *A43B 13/18* (2013.01); *A43B 3/0078* (2013.01); *A43B 3/10* (2013.01); *A43B 3/101* (2013.01); *A43B 3/24* (2013.01); *A43B 7/32* (2013.01); *A43B 23/07* (2013.01); *B29D 35/04* (2013.01)

(58) Field of Classification Search

CPC .......... A43B 3/10; A43B 3/101; A43B 3/107; A43B 3/108; A43B 3/24; A43B 23/00; A43B 23/0235; A43B 23/07; A43B 23/24

(Continued)

(56) References Cited

U.S. PATENT DOCUMENTS

| | | | | |
|---|---|---|---|---|
| 903,384 A | | 11/1908 | Jensen | |
| 1,803,554 A | * | 5/1931 | Knilans .................... | A43B 5/00 36/114 |

(Continued)

FOREIGN PATENT DOCUMENTS

| | | |
|---|---|---|
| CN | 2660947 Y | 12/2004 |
| CN | 101528073 A | 9/2009 |

(Continued)

OTHER PUBLICATIONS

PCT Application PCT/IB2014/000687; filed Jan. 24, 2014; Chow Chi Lap; International Search Report mailed Sep. 30, 2014.

(Continued)

*Primary Examiner* — Marie Bays

(74) *Attorney, Agent, or Firm* — Renner, Otto, Boisselle & Sklar, LLP

(57) ABSTRACT

An article of footwear includes an inner contact material operable to provide an interface between the article of footwear and portions of a wearer's foot. The inner contact material defines an inner foot opening through which a foot can be received. The inner contact material extends downwardly about the foot from the inner foot opening. An outer support material at least partially circumscribes portions of the inner contact material. The outer support material defines an outer foot opening through which a foot can be received. The outer support material extends downwardly about the foot from the outer foot opening. The inner foot opening is positioned higher around a periphery of the foot than is the outer foot opening so as to expose portions of the inner contact material above the outer support material.

31 Claims, 6 Drawing Sheets

10
12
32
16
34
14

(58) Field of Classification Search
USPC ....................................... 36/9 R, 55, 51, 136
See application file for complete search history.

(56) References Cited

U.S. PATENT DOCUMENTS

| | | | | |
|---|---|---|---|---|
| D85,248 S | | 9/1931 | Laird | |
| D86,261 S | | 2/1932 | Morali | |
| D91,532 S | | 2/1934 | Morali | |
| D93,515 S | | 10/1934 | Phifer | |
| D93,808 S | | 11/1934 | Batterman | |
| D94,104 S | | 12/1934 | Weidner | |
| D94,233 S | | 1/1935 | Peruga | |
| D96,499 S | | 8/1935 | Phifer | |
| D96,542 S | | 8/1935 | Goldberg | |
| D94,933 S | | 9/1935 | Weinstat | |
| D98,700 S | | 2/1936 | Watson | |
| D101,463 S | | 10/1936 | Joyce | |
| D103,504 S | | 3/1937 | Oswell | |
| 2,147,197 A | * | 2/1939 | Glidden | A43B 1/02 36/3 A |
| D116,913 S | | 10/1939 | Comptom | |
| D119,885 S | | 4/1940 | Lippert | |
| D121,887 S | | 8/1940 | Bemnjamin | |
| D129,278 S | | 9/1941 | Sutcliffe | |
| 2,347,872 A | * | 5/1944 | Blanchard | A43B 13/04 12/142 R |
| 2,383,117 A | * | 8/1945 | Fellman | A43B 13/223 36/59 C |
| D149,685 S | | 5/1948 | Sandler | |
| D154,513 S | | 7/1949 | Sandler | |
| 2,586,045 A | * | 2/1952 | Hoza | A43B 1/04 36/14 |
| D167,579 S | | 8/1952 | MacKinnon | |
| 2,675,631 A | * | 4/1954 | Carr | A43B 1/04 36/12 |
| 2,686,376 A | * | 8/1954 | Burkholz | A43B 3/02 36/101 |
| 2,982,033 A | * | 5/1961 | Bingham, Jr. | A43B 1/0027 36/100 |
| 3,561,140 A | * | 2/1971 | Ludwig | A43C 15/02 36/15 |
| 3,863,272 A | | 2/1975 | Guille | |
| D273,627 S | | 5/1984 | Huberman et al. | |
| 4,447,967 A | * | 5/1984 | Zaino | A43B 23/0235 36/45 |
| 4,712,319 A | * | 12/1987 | Goria | A43B 1/0036 359/518 |
| D297,068 S | | 8/1988 | Lee | |
| 5,086,576 A | * | 2/1992 | Lamson | A43B 5/14 36/131 |
| D347,518 S | | 6/1994 | Stewart | |
| 5,617,585 A | * | 4/1997 | Fons | A41B 11/007 2/239 |
| D380,593 S | | 7/1997 | Lauzon | |
| 5,647,150 A | | 7/1997 | Romanato et al. | |
| 5,862,614 A | * | 1/1999 | Koh | A43B 13/24 36/31 |
| 6,041,443 A | * | 3/2000 | Pas | A41B 11/005 2/239 |
| 6,149,852 A | | 11/2000 | Romanato et al. | |
| 6,308,438 B1 | * | 10/2001 | Throneburg | A43B 1/02 36/11 |
| 6,460,273 B2 | * | 10/2002 | Witjes | A43B 13/32 36/15 |
| 6,698,108 B2 | | 3/2004 | Pavelescu et al. | |
| 6,880,268 B2 | * | 4/2005 | Chen | A41B 11/007 36/10 |
| 6,931,762 B1 | * | 8/2005 | Dua | A43B 1/04 12/142 G |
| 7,010,872 B2 | * | 3/2006 | Pawlus | A43B 3/0047 36/100 |
| 7,165,344 B2 | * | 1/2007 | Blackwell | A43B 1/0036 36/134 |
| D571,548 S | | 6/2008 | Seamans | |
| 7,428,789 B2 | | 9/2008 | Holzer et al. | |
| 7,434,336 B2 | * | 10/2008 | Kosted | A43B 1/0081 36/10 |
| 7,578,076 B2 | * | 8/2009 | Pawlus | A43B 3/0047 36/100 |
| D619,790 S | | 7/2010 | Matalon | |
| 7,841,107 B2 | * | 11/2010 | Braynock | A43B 1/0036 36/100 |
| D668,027 S | | 10/2012 | Millieret | |
| D668,438 S | | 10/2012 | Millieret | |
| D668,847 S | | 10/2012 | Gavrieli et al. | |
| 2004/0128863 A1 | * | 7/2004 | Hong | A43B 3/24 36/100 |
| 2004/0255486 A1 | * | 12/2004 | Pawlus | A43B 3/0047 36/10 |
| 2005/0252043 A1 | * | 11/2005 | Blackwell | A43B 1/0036 36/134 |
| 2006/0090376 A1 | | 5/2006 | Perotto et al. | |
| 2006/0130359 A1 | * | 6/2006 | Dua et al. | A43B 1/04 36/9 R |
| 2006/0248748 A1 | * | 11/2006 | Warren | A43B 1/0081 36/9 R |
| 2007/0130805 A1 | * | 6/2007 | Brady | A43B 3/0078 36/136 |
| 2007/0205535 A1 | | 9/2007 | Vitulli | |
| 2008/0022558 A1 | * | 1/2008 | Kaufer | A43B 3/0031 36/100 |
| 2008/0060110 A1 | * | 3/2008 | Schmelzer | A42B 1/24 2/69 |
| 2008/0127525 A1 | * | 6/2008 | Blunden | A43B 23/24 36/136 |
| 2008/0163514 A1 | * | 7/2008 | Stassinopoulos | A43B 1/0081 36/100 |
| 2009/0199436 A1 | * | 8/2009 | Franklin | A43B 23/24 36/114 |
| 2010/0037488 A1 | * | 2/2010 | Moffitt | A43B 1/0081 36/136 |
| 2010/0186258 A1 | * | 7/2010 | Garza | A43B 1/0081 36/101 |
| 2012/0222331 A1 | * | 9/2012 | Blunden | A43B 23/24 36/102 |

FOREIGN PATENT DOCUMENTS

| | | |
|---|---|---|
| CN | 201422486 Y | 3/2010 |
| CN | 201869787 U | 6/2011 |
| CN | 201869787 U | 6/2011 |
| CN | 201957861 U | 9/2011 |
| CN | 102655776 A | 9/2012 |
| CN | 202514682 U | 11/2012 |
| CN | 202525198 U | 11/2012 |
| CN | 203851876 U | 10/2014 |
| FR | 2824451 | 11/2002 |
| FR | 2824451 A3 | 11/2002 |
| JP | 3041026 U | 9/1997 |
| JP | 3041026 U | 9/1997 |
| JP | 2001/000209 A | 1/2001 |
| JP | 2001000209 | 1/2001 |
| KR | 2010011837 | 11/2010 |
| KR | 1020100118337 A | 11/2010 |
| TW | 119165 | 1/2007 |

OTHER PUBLICATIONS

Ganter; Ganter Sensitiv—Shoes for Very Sensitive Feet; Ganter Shoes sales brochure; 2012; 7 pages; Ganter Shoes GmbH.

* cited by examiner

ARTICLE OF FOOTWEAR AND RELATED METHODS

PRIORITY CLAIM

Priority is claimed of and to U.S. Provisional Patent Application Ser. No. 61/756,624, filed Jan. 25, 2013, which is hereby incorporated herein by reference in its entirety.

BACKGROUND OF THE INVENTION

Field of the Invention

The present invention relates generally to the field of footwear.

Related Art

Conventional articles of footwear generally include two primary elements: an upper and a sole structure. Conventional upper portions of the footwear are designed in an attempt to provide a covering for the foot that securely receives and positions the foot with respect to the sole structure. The sole structure is often secured to a lower surface of the upper and is generally positioned between the foot and the ground. The sole structure is generally designed to attenuate ground reaction forces, and oftentimes, to provide traction and control foot motions, such as pronation. As such, the upper and the sole structure operate cooperatively to provide a comfortable structure that is suited for a wide variety of ambulatory activities, such as walking and standing.

While such concepts are well known in the art of footwear design, attempts continue to be made to provide a good balance between supporting the foot in the necessary manner while also providing a comfortable interface between the foot and the article of footwear. Some conventional designs provide a very comfortable interface between the foot and the upper, but do not provide sufficient support to enable the article of footwear to be worn for long periods of time. Other articles of footwear initially feel very comfortable to the wearer, but do not provide sufficient support to be worn for long periods of time.

SUMMARY OF THE INVENTION

In accordance with one aspect of the invention, an article of footwear is provided, including an inner contact material operable to provide an interface between the article of footwear and portions of a wearer's foot. The inner contact material can define an inner foot opening through which a foot can be received, the inner contact material can extend downwardly about the foot from the inner foot opening. An outer support material can at least partially circumscribe portions of the inner contact material. The outer support material can be operable to provide structural support to the wearer's foot while the wearer's foot is received within the article of footwear. The outer support material can define an outer foot opening through which a foot can be received. The outer support material can extend downwardly about the foot from the outer foot opening. The inner foot opening can be positioned higher around a periphery of the foot than is the outer foot opening so as to expose portions of the inner contact material above the outer support material.

In accordance with another aspect of the invention, an article of footwear is provided, including an inner contact material operable to provide an interface between the article of footwear and portions of a wearer's foot. The inner contact material can define an inner foot opening through which a foot can be received. The inner contact material can extend downwardly about the foot from the inner foot opening. An outer support material can at least partially circumscribe portions of the inner contact material, the outer support material operable to provide structural support to the wearer's foot while the wearer's foot is received within the article of footwear. The outer support material can define an outer foot opening through which a foot can be received. The outer support material can extend downwardly about the foot from the outer foot opening. The inner foot opening can define a different shape profile than does the outer foot opening.

In accordance with another aspect of the invention, an article of footwear is provided, including an inner contact material operable to provide an interface between the article of footwear and portions of a wearer's foot. The inner contact material can define an inner foot opening through which a foot can be received. The inner contact material can extend downwardly about the foot from the inner foot opening. An outer support material can at least partially circumscribe portions of the inner contact material, the outer support material operable to provide structural support to the wearer's foot while the wearer's foot is received within the article of footwear. The outer support material can define an outer foot opening through which a foot can be received. The outer support material can extend downwardly about the foot from the outer foot opening. A sole of the outer support material can include one or more pressure application regions formed therein, the pressure application regions differing from adjacent regions in one or more material properties.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
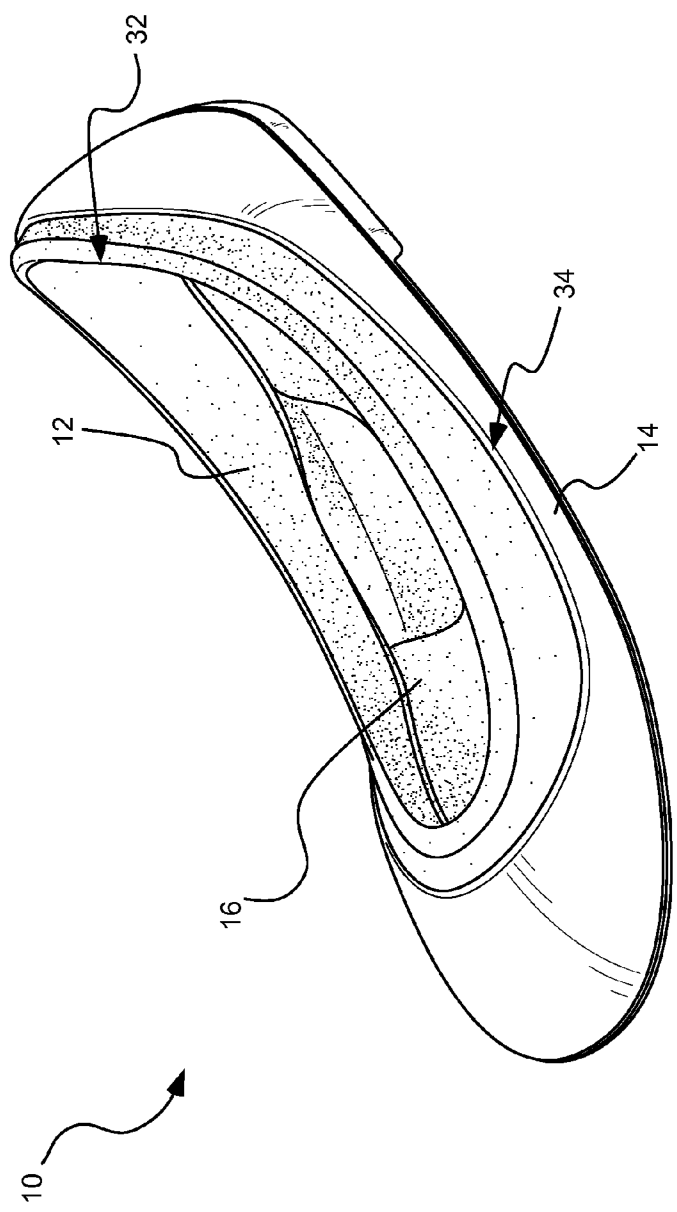
FIG. 1 is a perspective view of an article of footwear in accordance with an embodiment of the invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms “a” and “the” can include plural referents unless the context clearly dictates otherwise. Thus, for example, reference to “a decorative item” can include one or more of such items.

As used herein, the term “substantially” refers to the complete or nearly complete extent or degree of an action, characteristic, property, state, structure, item, or result. As an arbitrary example, an object that is “substantially” enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of “substantially” is equally applicable when used in a negative connotation to refer to the complete or near complete lack of an action, characteristic, property, state, structure, item, or result. As another arbitrary example, a composition that is “substantially free of” an ingredient or element may still actually contain such item as long as there is no measurable effect thereof.

As used herein, the term “about” is used to provide flexibility to a numerical range endpoint by providing that a given value may be “a little above” or “a little below” the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of “about 1 to about 5” should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

As shown generally in the figures, the present invention provides an article of footwear 10 that advantageously provides superior comfort to the wearer, while providing good support for walking and standing and while minimizing abrasion to skin areas of the foot. In one aspect, the article of footwear can include an inner contact material 12 that is operable to provide a comfortable interface between the article of footwear and portions of a wearer’s foot (a wearer is shown with the article of donned in FIG. 7). The article can include an outer support material 14 that at least partially circumscribes portions of the inner contact material. The outer support material can be operable to provide structural support to the wearer’s foot while the wearer’s foot is received within the article of footwear.

While not so required, in one aspect of the invention, the inner contact material 12 is integrally coupled with the outer support material 14, through a variety of manners. As used herein, the term “integrally coupled” can refer to a relationship in which the two materials are bonded one to another in such a manner that they will remain coupled to one another during normal use of the article. While the components might be torn from one another when discarded (or recycled, for example), two components that are integrally bonded to one another will remain bonded to one another during normal use of the article.

In one aspect, the outer support material 14 can be injected molded about the inner contact material 12 to provide the integral fit between the outer and inner materials. While the material from which the two components can be formed can vary, in one aspect of the invention, the inner contact material can be formed from a double-ply of mercerized cotton and a double-ply of spandex. This configuration provides good fabric breathing, minimal friction (between the foot and the article), and a good fit with the foot. This material also provides good wicking properties and can be used to apply an antimicrobial treatment to the product. As nearly all of the inner contact material can be in contact with a portion of the foot, the inner contact materials can provide wicking and antimicrobial properties to substantially the entire article of footwear.

In one aspect, the outer support material 14 can be formed from a PVC material. The PVC material can be varied in thickness (and shape) to optimize the weight of the article, the softness of the article, and the flexibility of the article. Also, the thickness and/or texture of the outer support material can vary at locations along the outer portion of the article. For example, in one embodiment the upper portion of the outer support material can be from about 0.20 cm to about 0.35 cm. In one aspect, the outer support material is about 0.28 cm in thickness. The sole portion (30 in FIGS. 3 and 4) of the article can be formed with a thickness from about 0.3 cm to about 0.6 cm, and in one embodiment is about 0.4 cm.

While the thickness, formulation and construct of the outer support material 14 (and the inner contact material 12) can vary, it is generally the case that the outer support material provides ample support to the foot, while the inner contact material shields the foot from abrasive contact with the outer support material. The shape and contour of the outer support material can be specifically designed to avoid contacting the foot in particular areas. For example, the outer support material can be shaped so as to avoid any contact, or minimal contact, with areas of the foot where bunions, Hallux Valgus, Bunionette, etc., can commonly be issues (see, for example, region 28 in FIG. 7). Even in those areas where support from the outer support material is necessary, the inner contact material can shield the foot from becoming damaged in these sensitive areas.

Figure 7:
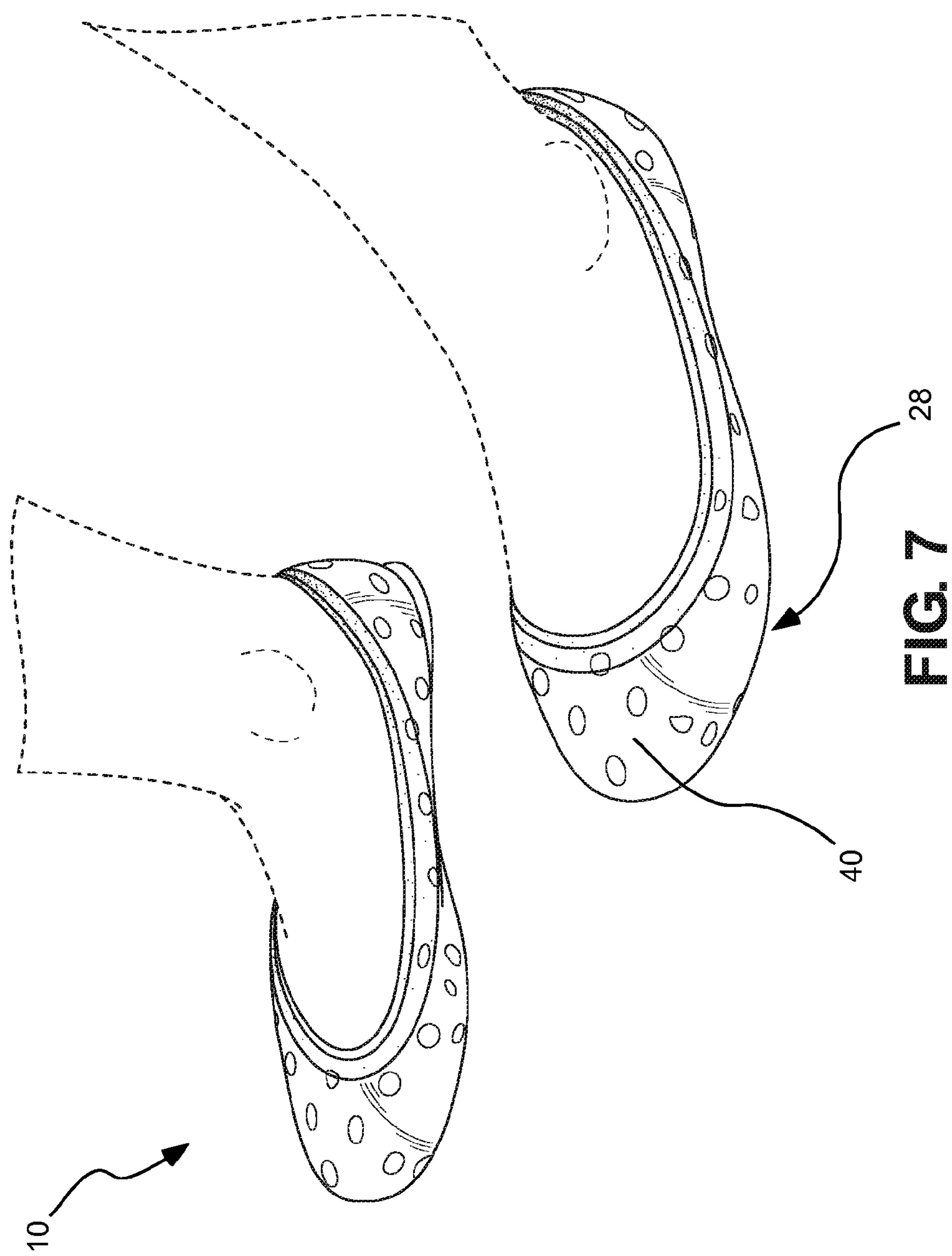
FIG. 7 is a top, perspective view of a pair of articles of footwear in accordance with the present invention donned by a user.

In the exemplary embodiments shown in the figures, the inner contact material 12 can be formed with, or can have applied thereto, a decorative color and/or pattern (see, e.g., the “polka-dot” arrangement in FIG. 7). The outer material 14 can also be provided with a similar, or dissimilar, or complementary coloring or pattern. In one embodiment, the outer support material can be formed from an at least partially transparent or translucent material (such as that in FIG. 7), such that the pattern on the inner contact material can be visible through the outer support material, as shown in FIG. 7.

Figure 2:
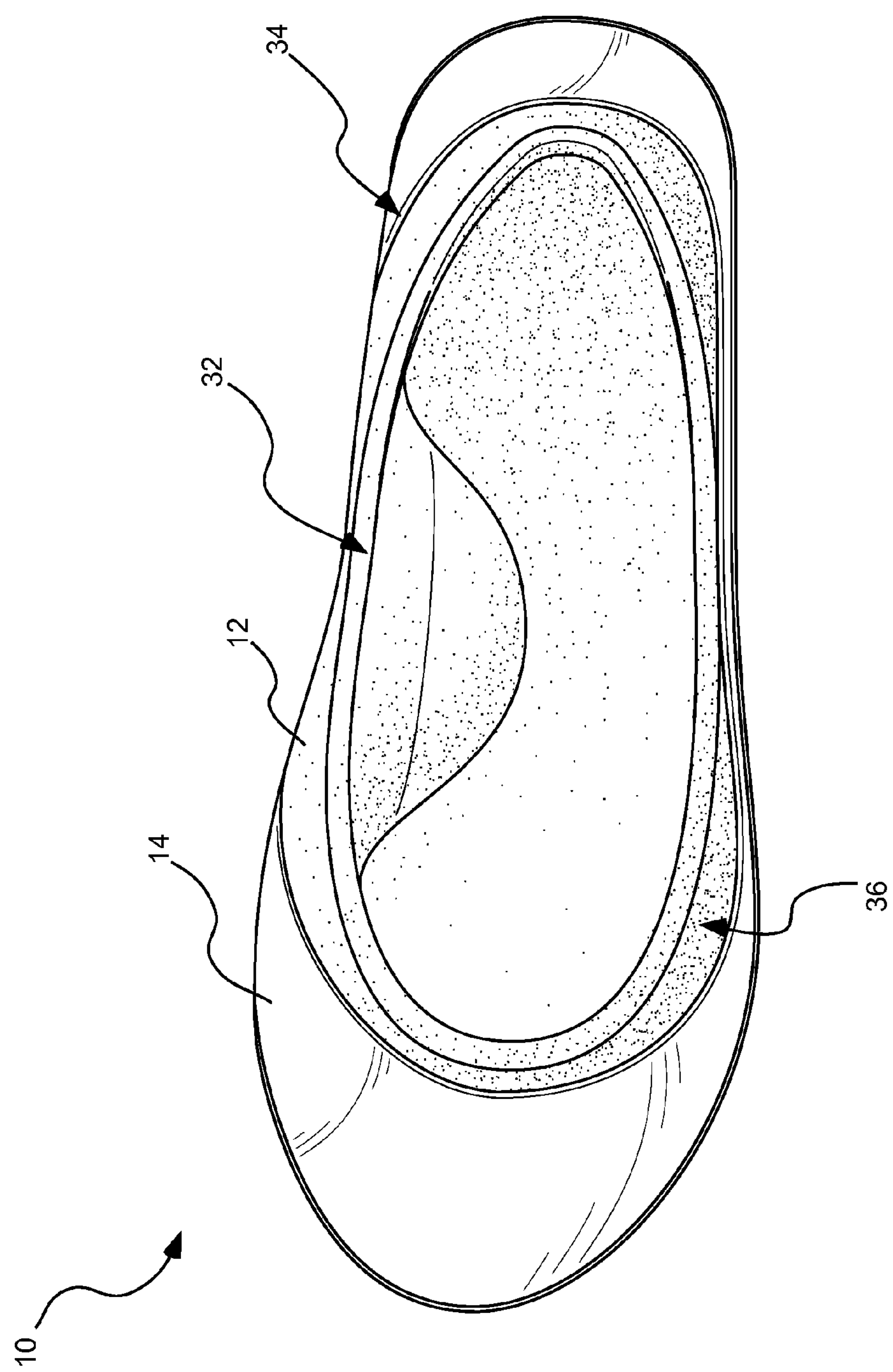
FIG. 2 is a top view of the article of footwear of FIG. 1.

As shown by example in FIG. 2, each of the inner contact material 12 and the outer support material 14 can define a foot opening through which a foot can be received within the article of footwear. In the example shown, the inner foot opening is illustrated by opening 32 and the outer foot opening is illustrated by opening 34. In one aspect, the opening 32 defined by the inner contact material will not correspond to the opening 34 defined by the outer support material. This can allow a wearer's foot to be strategically supported in specific areas by both the inner contact material and the outer support material, but be in contact only with the inner contact material in other specific areas. In this manner, the foot can be adequately supported for a variety of tasks, yet minimize frictional wear on skin of the foot in other areas. As an example, in the area indicated at 36 in FIG. 2, the foot is supported only by the inner contact material 12, and not the outer support material 14.

The overall shape of the article can vary according to the aesthetic desired and the support desired. In one aspect, the overall appearance of the shoe can be that of a ballet flat, or ballerina flat. Despite similar appearances to existing footwear designs, however, the present technology provides much better support with much less damaging contact with the foot. The figures illustrate a variety of shapes that can be provided to achieve this affect. A variety of round toe, pointed toe, and open toe designs can be achieved using the present technology. In one aspect, the toe portion can include one or more openings formed therein to provide a "peep-hole" effect.

As shown in at least FIG. 1, the article of footwear can include a removable cushion or insole 16 that can be removably installed within the article of footwear. While not so limited, in one aspect, the removable cushion or insole can be secured within the article of footwear using a hook-and-loop fastening system (such as a Velcro™ system). The ability to provide interchangeable insoles allows the footwear to account for the natural variations in foot thickness, as well as swelling and shrinking of the foot due to weather and temperature changes. The insoles can also be removed to allow the article to be washed, or to replace or wash the insole. A thickness of the insoles can be varied to provide comfort and adjustability for users.

Figure 4:
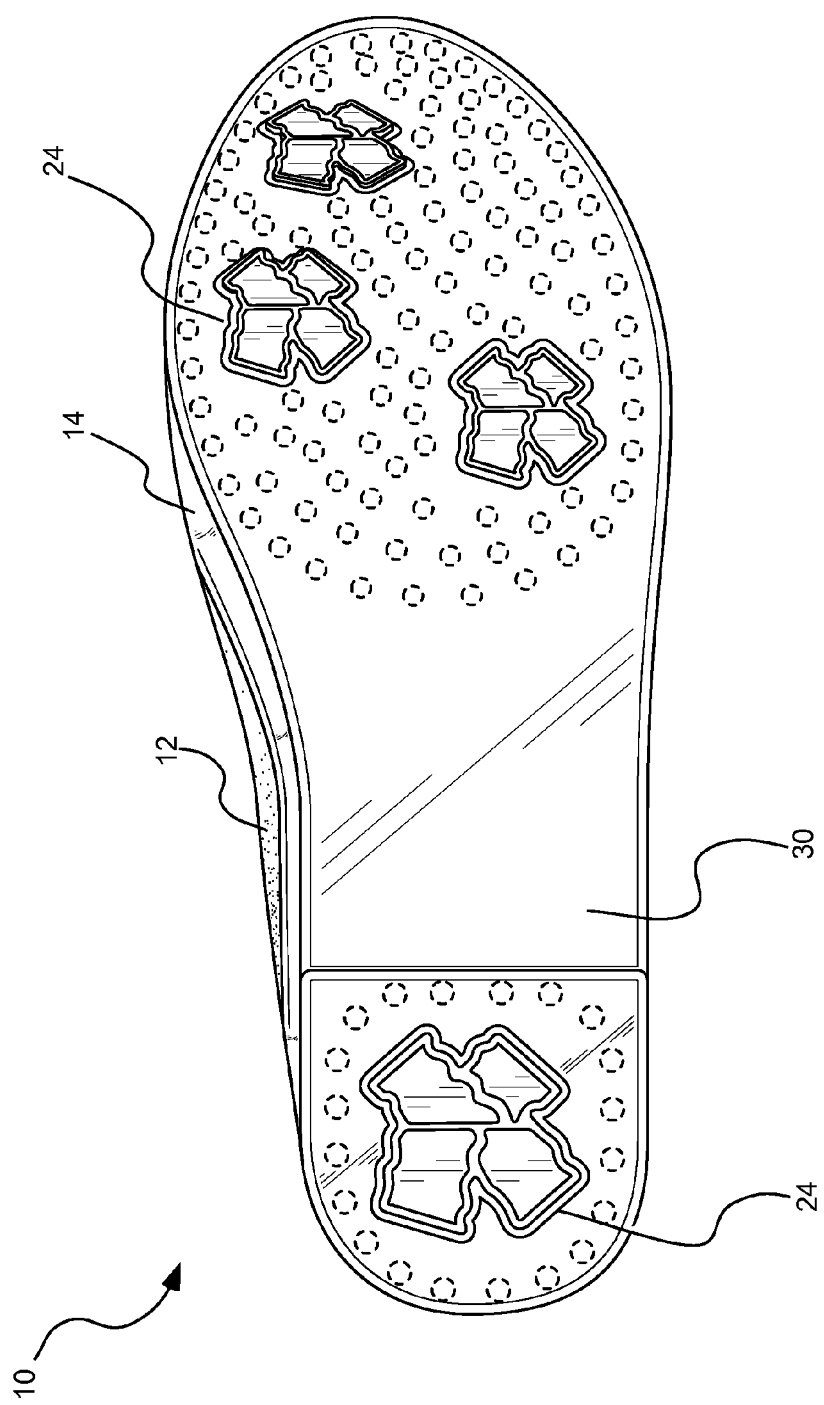
FIG. 4 is a bottom view of the article of footwear of FIG. 1.
Figure 6:
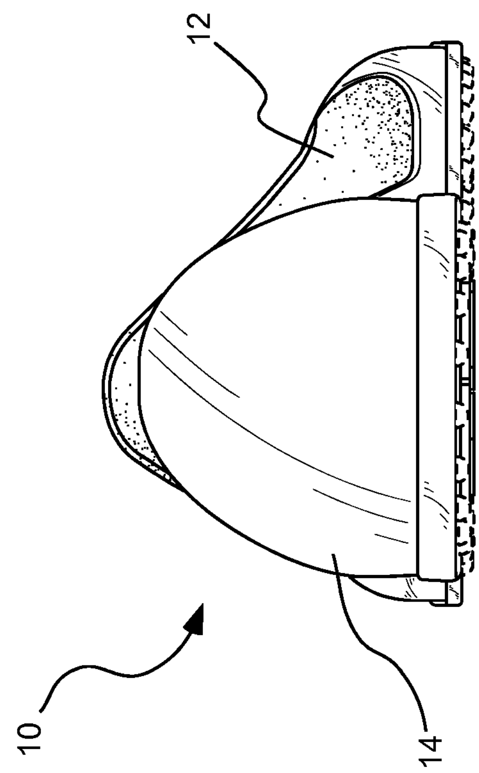
FIG. 6 is a rear, heel end view of the article of footwear of FIG. 1.
Figure 5:
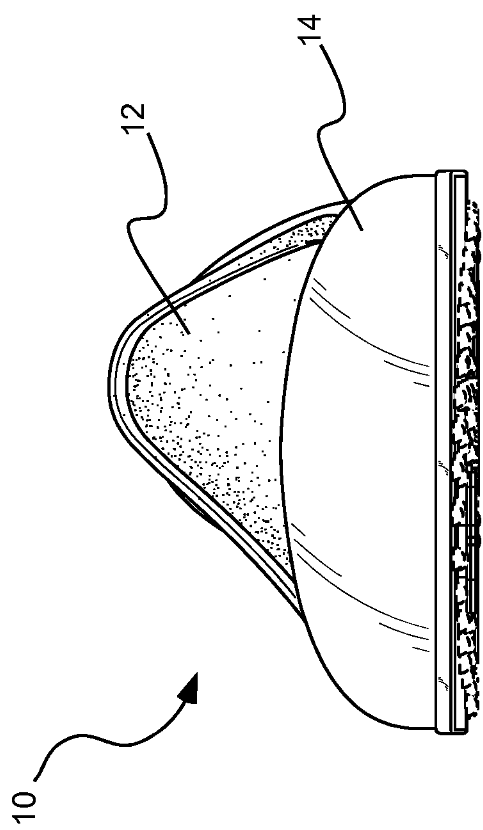
FIG. 5 is a front, toe end view of the article of footwear of FIG. 1.

As best shown in FIG. 4, in one aspect of the invention, one or more pressure application regions 24 can be formed on or in, or coupled to, the bottom (sole) surface 30 of the article of footwear. The pressure application regions can be formed in a variety of manners. For example, they can be defined by regions of thicker material (including the addition of material at these points), regions of a more rigid material, regions having different geometric patterns formed therein, and combinations thereof.

The pressure application regions 24 can provide pressure to the sole portion of the foot at specific pressure points to relieve stress caused by standing or walking. The pressure application regions can also be colored differently than surrounding areas for an aesthetically pleasing appearance. The pressure application regions 24 are shown as bows in the figures. It is to be understood, however, that the geometry can vary, including, without limitation, circles, ovals, squares, random ridges or designs, etc.

The sole portion 30 of the outer support material 14 can be formed in a variety of manners. In one aspect, the sole portion is integrally formed with the remaining outer support material in one step (such as an injection molding step, for example). In other examples, the sole portion can be attached as a separate unit.

The present technology provides a number of advantages over existing technology. For example, many people often get blisters on or near the metatarsophalangeal joint ("MTP") joint if their shoes are too tight, or they are worn for long periods of walking or standing. They may often apply a bandage in this joint area to avoid injury caused by contact with tough shoe material. In contrast, however, the present article of footwear can provide a "ballet shoe" curve positioned on one or both sides of the article, which can be designed to avoid injury to skin at the MTP joint since this area is in contact with the relatively soft inner contact material 12 (and not the combination of the soft inner material covered by the more rigid outer material 14).

Also, in some so-called "sock-shoe" products, the shoe cap toe length can be less than is needed for the length of the typical wearer's toe. Due to this, toes can easily be injured when walking in this type of conventional footwear. The present technology, however, can provide a cap toe length that is sufficiently long to cover the average wearer's toe length to avoid or prevent this type of injury to the toes (see, e.g., FIG. 7). The toe length is sufficient to cover most toes while also avoiding contact with the MTP joints. This is sufficient support to support the foot while walking, yet provides optimal comfort as abrasion with the MTP joint is avoided. In this example, the shoe cap 40 (FIG. 7) can extend substantially completely over and cover the joints between the metatarsus and phalanges bones.

In addition, many of the injected-molded shoes on the market include very rough edges. This can injure the skin of the foot causing blistering and similar discomfort. The edges of the present article are integrated with, and thereby covered by, a soft inner material to provide optimal comfort without sacrificing support.

Many "sock-shoe" products available can provide a soft feel to the foot, but provide little support, particularly from the sides of the shoe. A typical wearer's feet will shift laterally from side-to-side when walking in these shoes, as there is no support from a firmer shoe section. When it is attempted to provide support, the skin is easily injured from being in contact with the rough edges of the shoe. However, the present technology provides a curvature to the outer support material, in combination with the softness of the inner contact material, to provide both softness and support when walking.

Figure 3:
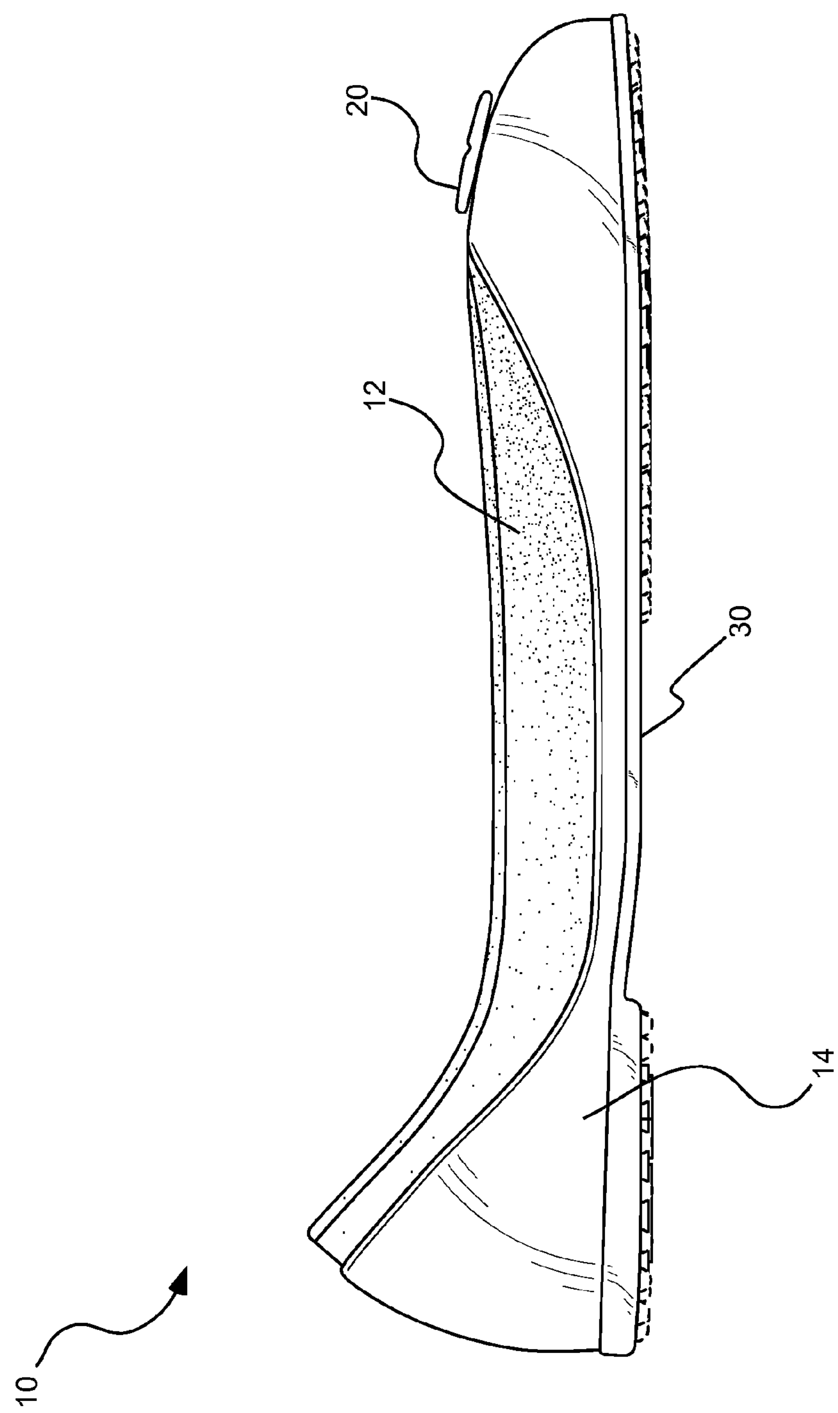
FIG. 3 is a side view of the article of footwear of FIG. 1.

As shown in side view in FIG. 3, in one aspect of the invention, one or more decorative items 20 can be provided and can be attached to the article of footwear in a variety of manners. In one aspect, the decorative items are removably attached, and can be interchangeably attached to the article. In this manner, a consumer can quickly and easily change the appearance of the shoe as he or she feels at the time. A variety of decorative items can be provided, including feathers, bows, butterflies, etc.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

We claim:

1. An article of footwear, comprising:

an inner contact material operable to provide an interface between the article of footwear and portions of a wearer's foot, the inner contact material defining an inner foot opening through which a foot can be received, the inner contact material extending downwardly about the foot from the inner foot opening; and an outer support material that is more rigid than the inner contact material, at least partially circumscribing portions of the inner contact material, the outer support material operable to provide structural support to the wearer's foot while the wearer's foot is received within the article of footwear, the outer support material including a toe end, a heel end distally opposite the toe end, a toe-supporting portion that extends from the toe end towards the heel end, and an outer foot opening through which a foot can be received defined between a rear edge of the toe-supporting portion and the heel end, the outer support material extending downwardly about the foot from the outer foot opening;

wherein the inner foot opening is positioned higher around a periphery of the foot than is the outer foot opening so as to expose portions of the inner contact material above the outer support material, wherein at the toe-supporting portion, an exposed portion of the inner contact material extends inwardly from the outer support material towards the heel end a distance less than a distance of the outer support material from the toe end to the rear edge of the toe-supporting portion.

2. The article of claim 1, wherein the inner contact material extends beneath substantially all of the outer foot support material.

3. The article of claim 1, wherein the inner contact material is irremovably coupled to the outer support material.

4. The article of claim 3, wherein the outer support material is injection molded about the inner contact material.

5. The article of claim 1, further comprising a cushion positioned within an inner sole portion of the article.

6. The article of claim 5, wherein the cushion is removably positioned within the inner sole portion of the article.

7. The article of claim 1, wherein the inner contact material is formed from an elastic cloth.

8. The article of claim 1, wherein the outer support material is formed from a polymer.

9. The article of claim 1, wherein a sole of the outer support material includes one or more pressure application regions formed therein, wherein the pressure application regions are independent from the outer support material and have different material properties than the outer support material.

10. The article of claim 9, wherein the one or more pressure application regions comprise regions formed in the sole of the outer support material having a greater thickness than surrounding portions of the outer support material.

11. The article of claim 9, wherein the one or more pressure application regions comprise regions formed in the sole having a greater rigidity than surrounding portions of the outer support material.

12. The article of claim 9, wherein the one or more pressure application regions comprise regions formed in the sole having a surface area with a different geometry than surrounding portions of the outer support material.

13. The article of claim 1, further comprising a decorative item, removably attached to the outer material of the article.

14. The article of claim 1, further comprising a plurality of decorative items, interchangeably attachable to the outer material of the article.

15. An article of footwear, comprising:

an inner contact material operable to provide an interface between the article of footwear and portions of a wearer's foot, the inner contact material defining an inner foot opening through which a foot can be received, the inner contact material extending downwardly about the foot from the inner foot opening; and an outer support material, at least partially circumscribing portions of the inner contact material, the outer support material operable to provide structural support to the wearer's foot while the wearer's foot is received within the article of footwear, the outer support material including a toe end, a heel end distally opposite the toe end, a toe-supporting portion that extends from the toe end towards the heel end, and an outer foot opening through which a foot can be received defined between a rear edge of the toe-supporting portion and the heel end, the outer support material extending downwardly about the foot from the outer foot opening towards the toe-supporting portion of the outer support material, the outer support material being continuous from the outer foot opening to the toe-supporting portion where a toe of the wearer's foot can be received; wherein the inner foot opening defines a different shape profile than does the outer foot opening, and wherein at the toe-supporting portion, an exposed portion of the inner contact material extends inwardly from the outer support material towards the heel end a distance less than a distance of the outer support material from the toe end to the rear edge of the toe-supporting portion.

16. The article of claim 15, wherein the inner contact material extends beneath substantially all of the outer foot opening.

17. An article of footwear, comprising:

an inner contact material operable to provide an interface between the article of footwear and portions of a wearer's foot, the inner contact material defining an inner foot opening through which a foot can be received, the inner contact material extending downwardly about the foot from the inner foot opening; and an outer support material, at least partially circumscribing portions of the inner contact material, the outer support material operable to provide structural support to the wearer's foot while the wearer's foot is received within the article of footwear, the outer support material including a toe end, a heel end distally opposite the toe end, a toe-supporting portion that extends from the toe end towards the heel end, and an outer foot opening through which a foot can be received defined between a rear edge of the toe-supporting portion and the heel end, the outer support material extending downwardly about the foot from the outer foot opening towards the toe-supporting portion of the outer support material, the outer support material being continuous from the outer foot opening to the toe-supporting portion where a toe of the wearer's foot can be received; wherein a sole of the outer support material includes one or more pressure application regions formed therein, the pressure application regions differing from adjacent regions in one or more material properties, and wherein at the toe-supporting portion, an exposed portion of the inner contact material extends inwardly from the outer support material towards the heel end a distance less than a distance of the outer support material from the toe end to the rear edge of the toe-supporting portion.

18. The article of claim 17, wherein the one or more pressure application regions comprise regions formed in the sole of the outer support material having a greater thickness than surrounding portions of the outer support material.

19. The article of claim 17, wherein the one or more pressure application regions comprise regions formed in the sole having a greater rigidity than surrounding portions of the outer support material.

20. The article of claim 17, wherein the one or more pressure application regions comprise regions formed in the sole having a surface area with different geometry than surrounding portions of the outer support material.

21. The article of claim 15, wherein the toe-supporting portion of the outer support material is a shoe cap that at least partially encloses the toe of the wearer's foot.

22. The article of claim 21, wherein the shoe cap includes one or more openings formed therein.

23. The article of claim 1, wherein at least part of the outer support material is translucent or transparent providing visibility of at least part of the inner contract material through the outer support material.

24. The article of claim 1, wherein the outer support material extends along both sides of the article from a back portion of the article to the toe-supporting portion.

25. The article of claim 24, wherein each of the sides of the outer support material are curved to conform to the wearer's foot to prevent the wearer's foot from laterally shifting.

26. The article of claim 15, wherein at least part of the outer support material is translucent or transparent providing visibility of at least part of the inner contract material through the outer support material.

27. The article of claim 15, wherein the outer support material extends along both sides of the article from a back portion of the article to the toe-supporting portion.

28. The article of claim 27, wherein each of the sides of the outer support material are curved to conform to the wearer's foot to prevent the wearer's foot from laterally shifting.

29. The article of claim 18, wherein at least part of the outer support material is translucent or transparent providing visibility of at least part of the inner contract material through the outer support material.

30. The article of claim 18, wherein the outer support material extends along both sides of the article from a back portion of the article to the toe-supporting portion.

31. The article of claim 30, wherein each of the sides of the outer support material are curved to conform to the wearer's foot to prevent the wearer's foot from laterally shifting.

* * * * *